United States Patent [19]
Simon

[11] Patent Number: 4,723,654
[45] Date of Patent: Feb. 9, 1988

[54] APPARATUS FOR CONVEYING A STACK OF BAGS

[75] Inventor: Helmut Simon, Lengerich, Fed. Rep. of Germany

[73] Assignee: Windmöller & Hölscher, Lengerich, Fed. Rep. of Germany

[21] Appl. No.: 883,644

[22] Filed: Jul. 9, 1986

[30] Foreign Application Priority Data

Jul. 9, 1985 [DE] Fed. Rep. of Germany ....... 3524486

[51] Int. Cl.⁴ .............................................. B65G 21/20
[52] U.S. Cl. ..................................................... 198/836
[58] Field of Search ................................ 198/341, 836

[56] References Cited

U.S. PATENT DOCUMENTS

| | | | |
|---|---|---|---|
| Re. 31,945 | 7/1985 | Magni | 198/836 X |
| 1,991,835 | 2/1935 | Axcell | 198/836 X |
| 2,684,626 | 7/1954 | Eberle | 198/341 X |
| 3,283,918 | 11/1966 | Devol | 198/341 X |
| 3,958,682 | 5/1976 | Martin | 198/341 |

FOREIGN PATENT DOCUMENTS

| | | | |
|---|---|---|---|
| 2858022 | 2/1980 | Fed. Rep. of Germany . | |
| 96747 | 6/1982 | Japan | 198/341 |

*Primary Examiner*—Nancy J. Stodola
*Attorney, Agent, or Firm*—Fleit, Jacobson, Cohn & Price

[57] ABSTRACT

Apparatus for conveying a stack of bags from a bag stacking station to a downstream processing station. The apparatus includes a conveyor belt, and a carriage that is movable in a conveying direction, the carriage including a belt clamping device to clamp the carriage to the belt, the carriage including a bag stack clamping device for clamping a stack of bags to the belt. Movement of the carriage simultaneously moves the conveyor belt and a stack of bags in the conveying direction, whereupon the belt clamp and the bag clamp are released, and the carriage is returned to the bag stacking station.

7 Claims, 2 Drawing Figures

APPARATUS FOR CONVEYING A STACK OF BAGS

BACKGROUND OF THE INVENTION

1. Field of the Invention

The present invention relates to apparatus for conveying stack of bags from a stacking station to a downstream processing station for further processing, and more particularly to a conveyor including a belt, and a bag clamping device to clamp a stack of bags to the belt for movement therewith.

2. Description of the Prior Art

Bag conveying apparatus is disclosed in German Patent Specification No. 28 58 022. The apparatus therein disclosed includes a conveyor belt that is intermittently operated by a suitable drive means, and that transports a carriage when the carriage has been clamped to the conveyor belt during its intermittent movement. A pneumatic piston-cylinder unit is provided for returning the carriage to its initial position when it has been released from the conveyor belt after the conveying operation has been completed. The apparatus disclosed in that publication is relatively expensive because separate drive means are required for the intermittent motion of the conveyor belt and for returning the carriage in a direction opposite to the direction of movement of the conveyor belt.

It is an object of the present invention to overcome the deficiencies of the prior art apparatus and to provide a simplified apparatus for conveying a stack of bags.

SUMMARY OF THE INVENTION

Briefly stated, in accordance with one aspect of the present invention, apparatus is provided for conveying a stack of bags from a stacking station to a downstream processing station by means of a conveyor belt. The apparatus includes a frame, and an endless conveyor belt that is movably supported on supporting rollers carried in the frame. One end of the conveyor belt is positioned adjacent a stacking station and is adapted to receive a stack of bags, in the form of individual bags as they are stacked one above another, and is adapted to transport the stack of bags linearly from the stacking station in a conveying direction to a subsequent downstream processing station. A carriage is provided and is movable on a pair of transversely spaced parallel tracks that extend in the direction of movement of the conveyor, and that are secured to the frame. A bag stack clamping means is supported on the carriage for selectively clamping and unclamping a stack of bags to the conveyor belt. Actuator means are provided for actuating the bag stack clamping means from a clamped position to an unclamped position. Additionally, belt clamping means are supported by the carriage for engaging the belt with the carriage for joint movement.

Drive means are provided for simultaneously moving the carriage along the tracks as a stack of bags is clamped to the conveyor belt, and as the conveyor belt is clamped to the carriage. When the stack of bags has been conveyed the desired distance, the bag stack clamping means and belt clamping means are each released, and the drive means moves the carriage in a direction opposite to the direction of conveyance of the conveyor belt while the belt remains stationary, and until the carriage has again reached the bag stacking station to clamp a subsequent stack of bags for movement in the conveying direction.

DESCRIPTION OF THE PREFERRED EMBODIMENT

Figure 1:
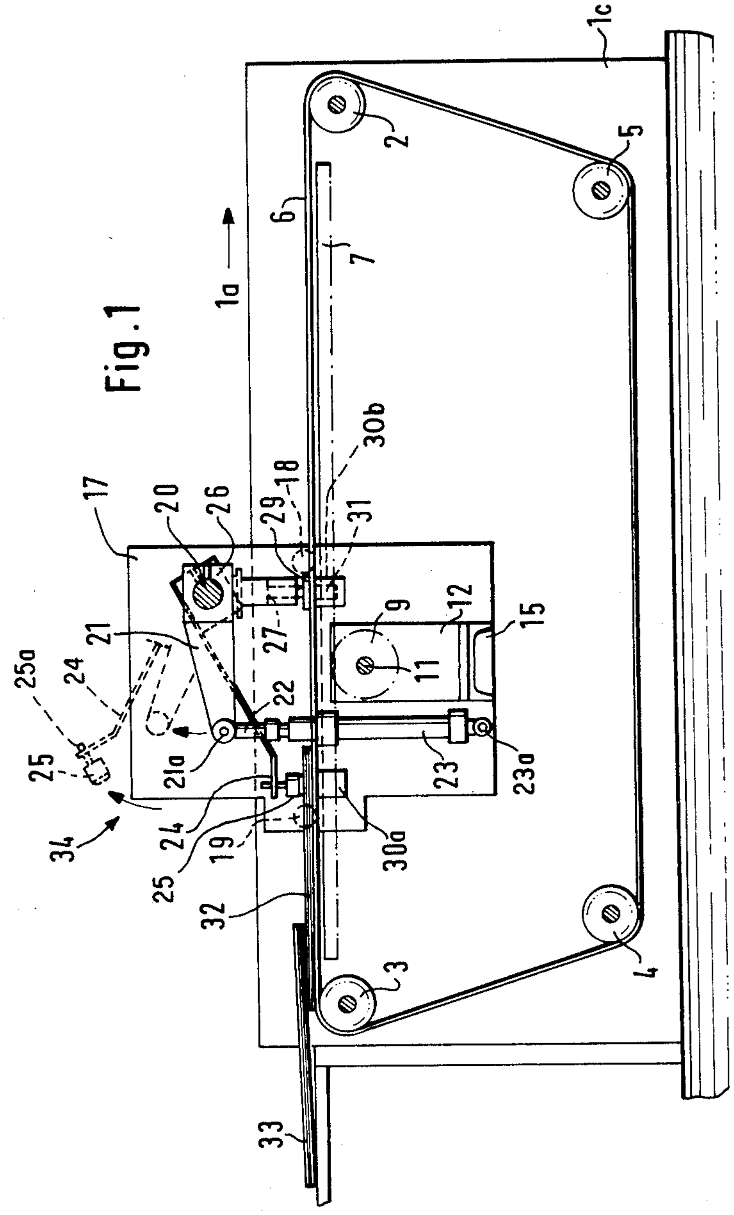
FIG. 1 is a side elevation showing apparatus in accordance with the present invention for conveying a stack of bags on a conveyor belt by means of a clamping carriage.
Figure 2:
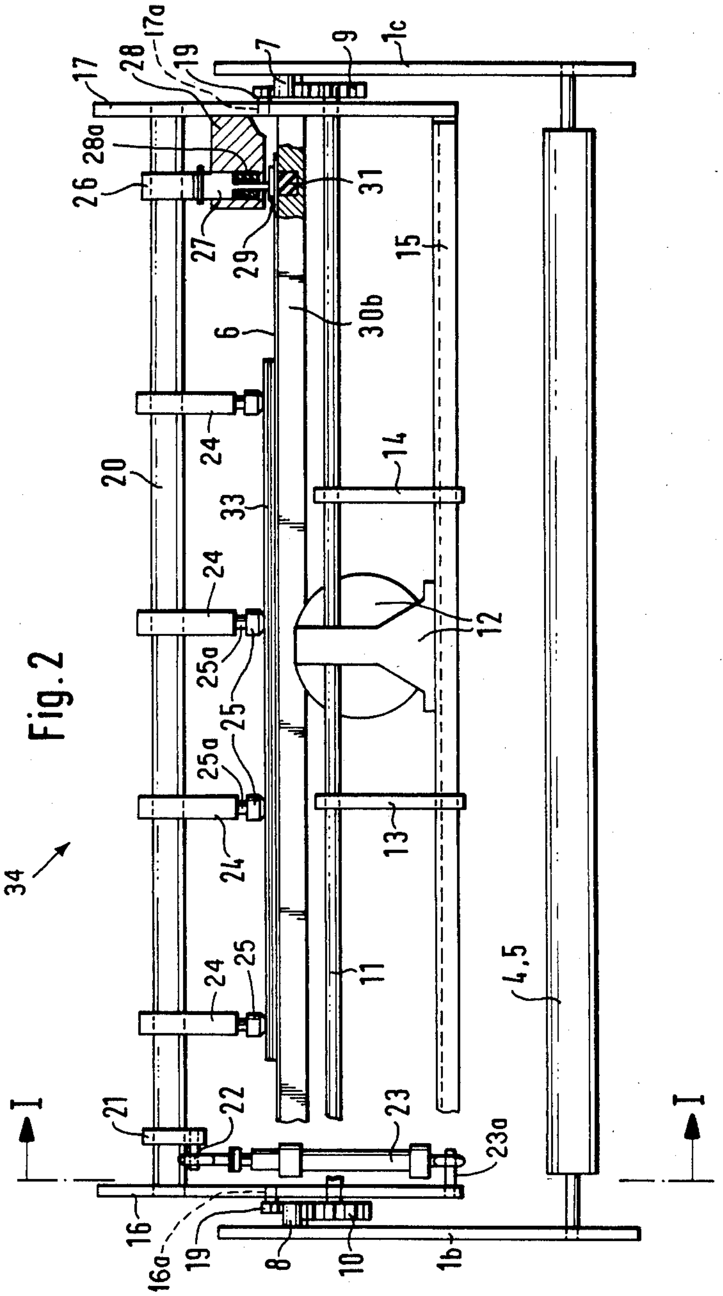
FIG. 2 is a front elevation of the apparatus of FIG. 1, viewed in the conveying direction.

Referring to drawing FIGS. 1 and 2, there is shown a machine frame 1*a* that supports a pair of parallel side walls 1*b* and 1*c* that are in transversely spaced relationship and that extend in the conveying direction as indicated by arrow A in FIG. 1. The side walls 1*b* and 1*c* rotatably support a plurality of rollers 2, 3, 4, and 5 over which an endless belt 6 passes. The run of the belt that extends between rollers 3 and 2 defines a bag stack conveying path and direction. Secured to side walls 1*b* and 1*c* are support bars 8, 7, respectively, that extend in conveying direction A. The upper surfaces of support bars 7 and 8 are adjacent the edges of the conveying run of belt 6 and define a pair of tracks, while the downwardly facing surfaces each include a rack for purposes to be described hereinafter.

A carriage 34 is positioned between respective side walls 1*b* and 1*c* and includes a pair of transversely spaced, substantially parallel side plates 16 and 17 that are interconnected by a transversely extending cross beam 15 that extends below the conveying run of the conveyor belt 6. Also extending between side plates 16 and 17 are a pair of parallel, transverse backing beams 30*a* and 30*b* that have upper surfaces positioned immediately below the conveying run of conveyor belt 6 to underlie the belt. Each of side plates 16 and 17 includes a pair of longitudinally spaced, parallel supporting shafts 16*a* and 17*a*, respectively, that support carrying rollers 18 and 19 that are adapted to roll along the upper surface of supporting bars 7 and 8 to permit movement of carriage 34 between belt rollers 2 and 3 in the conveying direction A, as well as in the opposite direction. A drive motor 12 is supported on cross beam 15, substantially centrally thereof in a transverse direction, and is drivingly connected to a transversely extending drive shaft 11 that is rotatably supported in each of side plates 16 and 17. The outermost ends of drive shaft 11 that extend between side plate 16 and side wall 1*b* and between side plate 17 and side wall 1*c* have secured thereto respective pinions 10 and 9 that engage with the racks formed in the downwardly-facing surfaces of support bars 8 and 7, respectively. Intermediate shaft supports 13 and 14 extend upwardly from cross beam 15 to provide additional support for drive shaft 11 and to rotatably support the same. Thus it is apparent that depending upon the direction of rotation of drive shaft 11 by drive motor 12 pinions 9 and 10 are driven in such a way as to move carriage 34 either in conveying direction A, or in the opposite direction.

Carriage 34 includes a pivot shaft 20 that is rotatably supported in and carried by side plates 16 and 17. Attached to pivot shaft 20 and spaced therealong are a plurality of hold-down members 24 that extend from shaft 20 toward the bag stacking station and are movable toward and away from conveyor belt 6 by pivoting movement of pivot shaft 20 about its axis. Hold-down members 24 are preferably formed from a resilient flexible material, such as spring steel, or the like, and at their outermost ends each of hold-down members 24 carries a rubber bumper 25 that is supported in a threaded shaft 25*a* that is threadedly received at the ends of hold-down members 24 for permitting adjustment of the positions of rubber bumpers 25 with respect to the outermost ends of hold-down members 24. A stack of bags 32 is shown in position on the top surface of belt 6 at a stacking station at the left-hand portion of FIG. 1. The several hold-down members 24 define bag stack clamping means which when lowered so that rubber bumpers 25 engage the top surface of a stack of bags 32, the bag stack is clamped between bumpers 25 and belt 6, and the latter is pressed against backing beam 30*a*. Hold-down members 24 are simultaneously pivoted about the axis of pivot shaft 20 by means of a piston-cylinder actuator 23 that is pivotally carried by side plate 16 at pivot 23*a* extending from plate 16, and that includes a piston rod 22 that is pivotally connected at its outermost end to a lever 21 at pivot 21*a*. Lever 21 is secured to shaft 20 for pivotal movement therewith.

Positioned on carriage 34 adjacent side plate 17 and secured to pivot shaft 20 is an eccentric cam 26 that engages a push rod 27. Push rod 27 is slidably carried in a bracket 28 secured to side plate 17 and extends inwardly therefrom. Bracket 28 receives a spring 28*a* that acts against push rod 27 to resiliently urge push rod 27 in an upward direction and into contact with the surface of eccentric cam 26. The lower portion of push rod 27 opposite from eccentric cam 26 includes a flat pressure pad 29 for engagement with endless belt 6. Push rod 27 is positioned below pivot shaft 20 and above backing beam 30*b* to permit clamping of the belt 6 to backing beam 30*b*. Preferably, backing beam 30*b* includes a rubber pad 31, or the like, in underlying relationship to push rod 27 to permit positive, non-sliding engagement of the lower surface belt 6 with backing beam 30*b* so that belt 6 moves with carriage 34 as the latter is transported in the conveying direction. Thus push rod 27 and backing beam 30*b* define a belt clamping device to clamp belt 6 to carriage 34.

In operation, a stack of bags 32 is deposited on the left-most portion of the conveying run of belt 6, as illustrated in FIG. 1. If desired, after a first bag stack 32 has been formed, a second bag stack 33 can be formed upstream of an in partially overlying relationship with bag stack 32 to define a shingled pair of bag stacks, or individual bag stacks can be formed and deposited on belt 6, as desired. The bag clamping portion of carriage 34 and the belt clamping portion thereof are initially each in an unclamped, upward position as shown in the dashed lines in FIG. 1, the hold-down members 24 being initially elevated by means of upward movement of piston rod 22 of piston-cylinder actuator 23 to pivot shaft 20 in a clockwise direction, thereby simultaneously causing eccentric cam 26 to rotate to a low point on the cam, whereupon spring 28*a* urges push rod 27 upwardly against cam 26 to thereby space pressure pad 29 upwardly from rubber pad 31 of backing beam 30*b*. Carriage 34 is then moved in a leftward direction as viewed in FIG. 1, if it is not already in that position, by suitably rotating drive shaft 11 by means of drive motor 12, to cause pinions 9 and 10 to move along the racks formed on support bars 7 and 8, and thereby causing rollers 18 and 19 to roll along the upper, surface of the support bars. When carriage 34 has reached the position shown in FIG. 1, piston-cylinder actuator 23 is actuated to move lever 21 in a counterclockwise direction, thereby bringing hold-down members 24 in a downward direction toward belt 6 and engaging rubber bumpers 25 with bag stack 32, thereby clamping the stack to belt 6 by the cooperative action of bumpers 25 and the underlying backing beam 30*a*. The clamping action is enhanced by the resilient nature of hold-down members 24. When lever 21 moves in a counterclockwise direction, it also causes eccentric cam 26 to rotate to present a high point on the cam opposite the push rod 27, thereby moving the push rod downwardly against the edge of endless belt 6 to clamp the same to rubber bad 31 carried in backing beam 30*b*. At that point both bag stack 32 and belt 6 are clamped to the respective backing beams 30*a* and 30*b*, and each is thereby secured to a portion of carriage 34.

To convey the bag stack 32, drive motor 12 is actuated to again cause drive shaft 11 to operate, this time in a counterclockwise direction to cause pinions 9 and 10 to travel along the racks formed on supporting beams 7 and 8 to convey carriage 34 in the conveying direction A shown in FIG. 1. Because the belt is supported on respective rollers 2, 3, 4, and 5, the belt, the carriage, and the bag stack move in conveying direction A to transport bag stack 32 in the conveying direction to a downstream position for subsequent processing. When carriage 34 has reached the downstream end of its path of travel, drive motor 11 is stopped and piston-cylinder unit 23 is actuated to again cause lever 21 to pivot in a clockwise direction, as viewed in FIG. 1, to turn pivot shaft 20 and thereby release hold-down members 24 from the bag stack and simultaneously release pressure pad 29 from belt 6. Thereupon carriage 34 is again caused to travel in a leftward direction as shown in FIG. 1, opposite to the conveying direction A, by operation of drive motor 12 and the operating cycle is repeated.

During the course of carrying bag stack 32 in the conveying direction A, the several bags of a bag stack cannot slip relative to each other because the hold-down members 24 serve to hold the entire stack of bags in position against the belt 6. Motion is imparted to the conveyor belt 6 only by the belt clamping device, and thus the belt and the bag stack move simultaneously.

Although particular embodiments of the present invention have been illustrated and described, it will be apparent to those skilled in the art that various changes can be made without departing from the spirit of the present invention. It is therefore intended to encompass in the appended claims all such changes that fall within the scope of the present invention.

What is claimed is:

1. Apparatus for conveying a stack of bags, said apparatus comprising:

(a) a frame;

(b) an endless conveyor belt movably supported on supporting rollers carried in said frame for conveying a stack of bags from a stacking station to a downstream processing station;

(c) a carriage movable along a pair of spaced, parallel tracks carried by said frame, said carriage movable parallel to a conveying direction of said conveyor belt;

(d) bag stack clamping means supported on said carriage for movement toward and away from a stack of bags on said conveyor belt;

(e) actuator means for actuating said bag stack clamping means between a clamping position and a nonclamping position to cause a stack of bags to be selectively clamped against said conveyor belt;

(f) belt clamping means supported on said carriage for engaging said belt for movement with said carriage; and (g) drive means for simultaneously moving said carriage and said belt in a conveying direction, and for moving said carriage in a direction opposite to said conveying direction and along said tracks.

2. Apparatus according to claim 1, wherein said bag stack clamping means includes a plurality of hold-down members movable into and out of engagement with a stack of bags carried on said conveyor means.

3. Apparatus according to claim 2, wherein said bag stack clamping means includes a shaft extending transversely of the conveying direction, and rotatably carried in said carriage, said plurality of hold-down members positioned at axially spaced positions along said shaft, said hold-down members formed from a resilient material and having first ends secured to said shaft and second ends spaced from said shaft and movable toward and away from said conveyor belt upon rotation of said shaft.

4. Apparatus according to claim 1, wherein said tracks include a rack, and said drive means includes a rotatable shaft, a pinion carried by said shaft and engageable with said rack, and roller means carried by said carriage, said carriage being movable along said tracks by rotation of said drive shaft.

5. Apparatus according to claim 3, wherein said bag stack clamping means includes actuator means for rotating the shaft, said actuator means including a fluid-operable piston-cylinder unit supported at one end on said carriage and on the other end to a lever secured to said shaft.

6. Apparatus according to claim 1, wherein said carriage includes a pair of transversely extending supports disposed below and engageable with the conveyor belt, said supports being spaced longitudinally from each other and in underlying relationship with said bag stack clamping means and with said belt clamping means.

7. Apparatus according to claim 1, wherein said belt clamping means includes push rod means carried by said carriage for engagement with said belt for clamping said belt to said carriage.

* * * * *